United States Patent [19]

Tres Casas

[11] Patent Number: 5,655,566
[45] Date of Patent: Aug. 12, 1997

[54] CARTRIDGE BASE FOR MONOBLOCK FAUCETS

[75] Inventor: Daniel Tres Casas, Vallirana, Spain

[73] Assignee: Caspro, S.A., Barcelona, Spain

[21] Appl. No.: 294,373

[22] Filed: Aug. 23, 1994

[30]  Foreign Application Priority Data

Dec. 2, 1993 [ES] Spain ................. 9303204 U

[51] Int. Cl.$^6$ ................. F16K 11/074; F16K 27/04
[52] U.S. Cl. ................. 137/454.6; 137/625.17; 137/625.4
[58] Field of Search ................. 137/625.17, 625.4, 137/454.6

[56]   References Cited

U.S. PATENT DOCUMENTS

| | | | |
|---|---|---|---|
| 3,592,229 | 7/1971 | Moen | 137/625.17 |
| 4,676,270 | 6/1987 | Knapp et al. | 137/624.4 |
| 4,705,072 | 11/1987 | Egli | 137/625.4 X |
| 4,733,688 | 3/1988 | Lorch | 137/625.17 X |
| 4,735,357 | 4/1988 | Gregory et al. | 4/623 |
| 4,762,273 | 8/1988 | Gregory et al. | 236/93 R |
| 4,796,666 | 1/1989 | Bergmann | 137/625.17 |
| 4,887,642 | 12/1989 | Bernat | 137/625.41 |
| 4,942,902 | 7/1990 | Knapp | 137/624.4 X |
| 4,971,113 | 11/1990 | Pawelzik | 137/625.4 X |
| 4,981,160 | 1/1991 | Sen-Tein | 137/801 |
| 5,095,934 | 3/1992 | Iqbal | 137/270 |
| 5,329,958 | 7/1994 | Bosio | 137/625.17 X |
| 5,404,911 | 4/1995 | Tres Casas | 137/625.17 |

FOREIGN PATENT DOCUMENTS

| | | |
|---|---|---|
| 0116771 | 5/1959 | Argentina . |
| 0227848 | 10/1982 | Argentina . |
| 0217988 | 4/1987 | European Pat. Off. . |
| 0 571 768 | 12/1993 | European Pat. Off. . |
| 2 909 939 | 9/1980 | Germany . |
| 3 402 103 | 3/1985 | Germany . |
| 9 106 262 | 9/1991 | Germany . |
| 9 203 391 | 11/1992 | Spain . |

*Primary Examiner*—Stephen M. Hepperle
*Attorney, Agent, or Firm*—Klauber & Jackson

[57]   ABSTRACT

A cartridge base, for use in a monoblock faucet having a handle which is pivotable and rotatable to achieve open and closed flows of hot and cold water, the cartridge base including a base body with a pair of inlet ports and an exit port, wherein the centroid of the outlet opening of each of the inlet ports is offset from the centroid of their respective inlet openings, such that the handle is positioned above the outlet opening in the cold water inlet port when in a closed flow position.

19 Claims, 3 Drawing Sheets

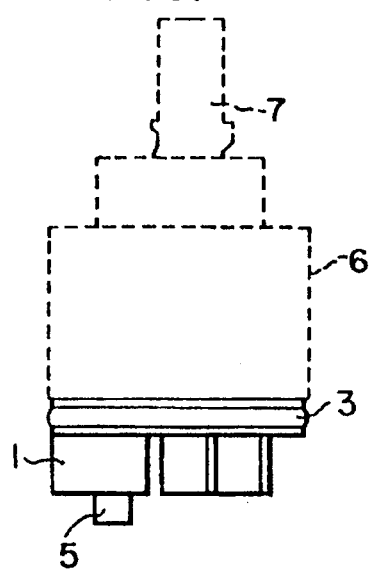
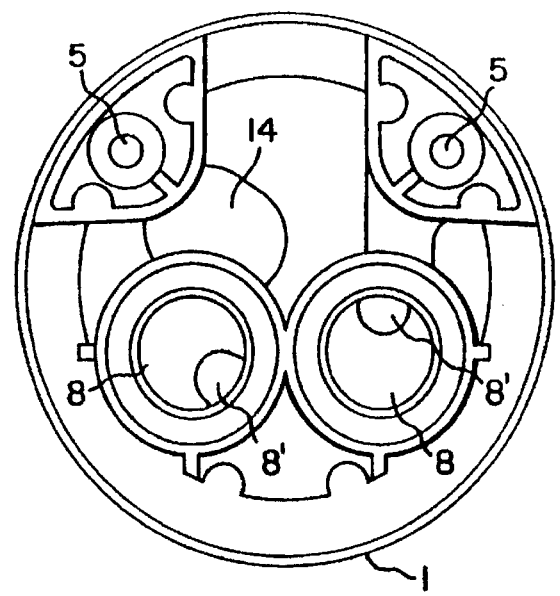
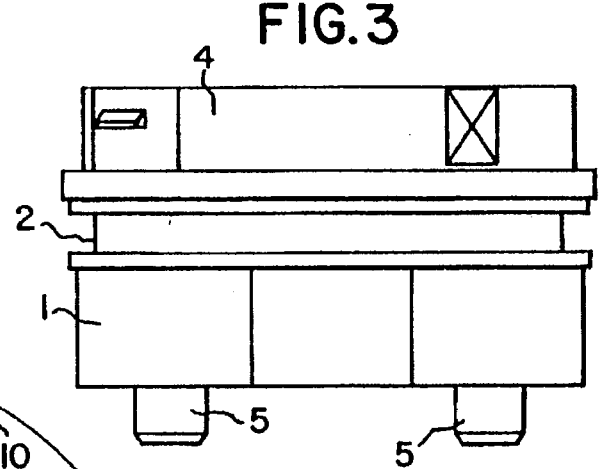
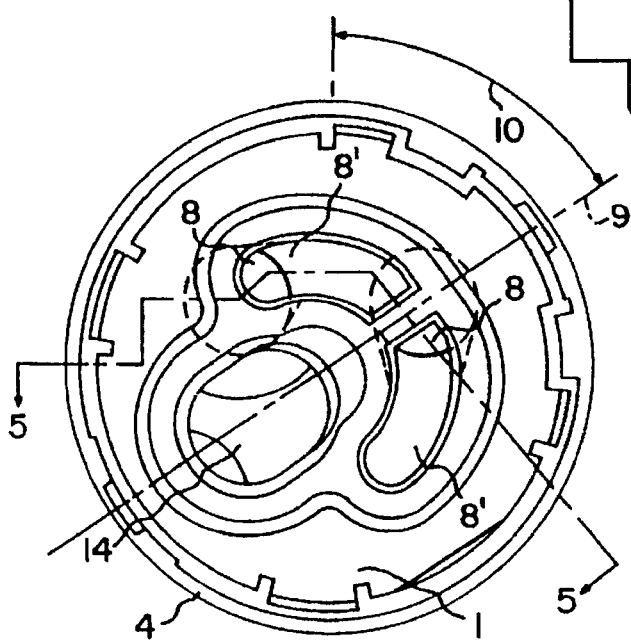

CARTRIDGE BASE FOR MONOBLOCK FAUCETS

OBJECT OF THE INVENTION

As is expressed in the title of this specification, the present invention refers to an improved cartridge base for monoblock faucets, which has been conceived and made to obtain numerous noteworthy advantages with regard to other existing means for similar purposes.

The cartridge base itself is provided for specific use in the type of monoblock faucet in which the operating lever or handle is aligned with the pipe of the faucet in the maximum outflow position of cold water, having the particularity that the two inclined holes with which the cartridge base normally has, for the in-flow of cold water and hot water and the corresponding flow towards the pipe, are provided with a change of path between the circular input end thereof or this end with any other shape and the output end oblong and arched.

BACKGROUND OF THE INVENTION

Monoblock faucets include a cartridge inside of which there is a piece called the "cartridge base," as well as some disks, one of them connected to a locking rod to the corresponding operating handle or lever, so that the combination of elements between the lever and the cartridge base makes the vertical movement upward/downward of this operating lever or handle involve the opening and/or closing of the faucet, while the horizontal or transversal movement between some limits of this operating lever or handle, involves, in the opening position, the outflow of cold water, mixing of cold water—hot water and hot water, depending on the position of the transversal rotation of the lever.

In this type of monoblock faucet, when the operating lever or handle is superimposed in the same vertical plane as the pipe of the faucet, the operating of the former to carry out the opening in that position to give rise to the outflow of cold water and hot water, this means that in the normal opening of the monoblock faucet, there will be an unnecessary energy expenditure upon the faucet opening in a middle position of cold water and hot water.

In order to solve this problem, the applicant itself of the patent in question is in turn the owner of several utility models, among which Spanish application for utility model 9202141 and Spanish application for utility model 9203391 can be cited. The first one claims an angular outphasing between the symmetric axis of the locking between the rod and the operating handle and the horizontal or symmetric axis of the handle itself, which is going to determine that the position of the handle and pipe facing each other in the same vertical plane, corresponding to the position of maximum outflow of cold water, solving the above cited problem, in other words, that if in said position the faucet is opened logically only cold water and not hot water will flow out as would happen in conventional monoblock faucets.

On its part, in application for utility model 9203391, aside from considering the concept claiming that the holes provided in the cartridge base for the inflow of cold water and hot water towards the inside and the corresponding out-flow thereof towards the pipe, are inclined straight holes, likewise claiming the fact that the shaft placed between these holes remains moved anglewise with regard to the horizontal axis of the pipe, whose angular outphasing has an extent that is approximately half the degrees existing between both end positions of the operating lever or handle, for the purpose of achieving the above, in other words, that the opening of the faucet is done in the position of maximum outflow of cold water, when the operating handle or lever is superimposed in the same vertical plane as the pipe.

Now then, the obtainment or making inclined straight holes in the cartridge base, turns out to be difficult and expensive, above all if said base is obtained by molding.

DESCRIPTION OF THE INVENTION

The cartridge base object of the invention is of the type referred to in the above section, in other words, that includes the corresponding inclined holes for the inflow of cold water and hot water.

Now then, the novelty of the invention lies on the fact that these holes, instead of being straight, have a bend or change of path, it being possible to obtain each one of them easily by means of two punches that, duly placed in the mold, attain between both the inclined but bent hole.

The specific shape of each hole is such that the end corresponding to the inlet of the same, from the body of the faucet, begins being circular and then narrows as determined by an approximation of the walls corresponding to the two opposite sectors of the inside contour of the hole, whose narrowing is complemented by an arched and inclined expansion towards the opposite or outlet end, determining that the contour of the latter is oblong, in other words, narrow and following an arched path, considerably longer than the diameter of the initial or inlet end of the hole. The expension is determined by a slight divergence or bend of a sector and by an accentuated divergence or big slant of the opposite sector.

The bent hole will always be inclined, the paths having the possibility of being straight on both sides of the corresponding bend or change of path, or else they may be arched, defining a S shape or even one with an arched path and one with a straight path, and in general any shape that meets the condition that the hole is inclined and has a bend or change of path, as well as the inlet end of the same being preferably circular, though it may also be oval or of any other suitable shape, the outlet end having to be oblong, in other words, elongated, narrow and with an arched path.

Obviously, the middle axis between these two inclined holes will be moved anglewise with regard to the horizontal axis of the pipe, the extend of the angular movement being approximately equal to half the degrees existing between both end positions of the operating handle or lever, so that the axis of the handle coincides with the axis of the pipe in the maximum cold water position.

DESCRIPTION OF THE DRAWINGS

In order to complete the description that is going to be made hereinafter and for the purpose of providing a better understanding of the features of the invention, the present specification is accompanied by a set of drawings on the grounds of which one will more easily understands the innovations and advantages of the cartridge base for monoblock faucets made in accordance with the object of the invention.

FIG. 1 shows a side raised view of the cartridge base of the invention mounted on the corresponding cartridge with the operating rod associated to the same and represented in dash lines.

FIG. 2 shows a bottom plan view of the cartridge base, wherein the cold water and hot water inlet holes are seen.

FIG. 3 is a side raised view of the cartridge base itself.

FIG. 4 is a top plan view of the same cartridge base, where one clearly sees the oblong and arches shapes of the outlets corresponding to the inclined holes provided for in the cartridge base.

DESCRIPTION OF A PREFERRED EMBODIMENT

Figure 5:
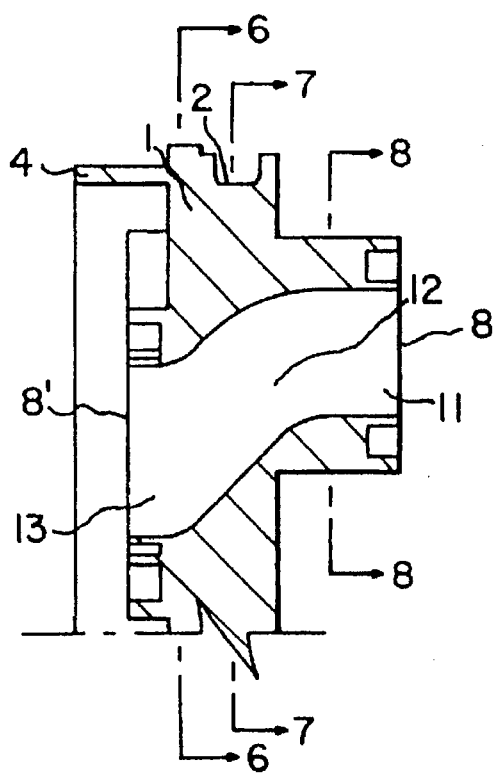
FIG. 5 shows a section view corresponding to the cutting line A—A of the above figure, showing the change of path that each one of the holes provided for in the cartridge base has.

In a particular embodiment, the present invention comprises a cartridge base for use in a monoblock faucet, the cartridge base being adapted to connect with a hot water inlet source and a cold water inlet source.

The monoblock faucet comprises a faucet body capable of being mounted on top of the cartridge base, a control rod pivotally and rotationally mounted at the top of the faucet body, a handle attached to the top end of the control rod, a movable disk pivotally attached to the bottom end of the control rod, wherein a movement of the handle moves the control rod, thereby moving the movable disk in a substantially horizontal plane, and at least one bore disposed in the movable disk.

The cartridge base comprises: a base body having a bottom surface and a top surface; a pair of inlet ports adapted to connect to the respective hot and cold water inlet sources and disposed through the base body and extending from the bottom surface to the top surface thereof, each of the inlet ports having an inlet opening disposed on the bottom surface, an outlet opening disposed on the top surface, and an inlet wall surface connecting the inlet opening with the outlet opening; and an exit port disposed through the base body and extending from the top surface to the bottom surface thereof, the exit port having an inlet opening disposed on the top surface, an outlet opening disposed on the bottom surface, and an exit wall surface connecting the inlet opening with the outlet opening, wherein the inlet wall surface includes at least one bend. The at least one bore in the movable disk is capable of linking the inlet ports to the exit port.

The inlet openings of the pair of inlet ports define therebetween an inlet vertical plane of symmetry. The centroid of the outlet opening has an offset from the centroid of the inlet opening in each respective inlet port. The term "centroid," applied here as commonly used in the field of mechanics, refers to the point which may be considered as the center of the opening wherein the sum of the displacements of all points in the opening from such a point are zero. The outlet openings of the pair of inlet ports define therebetween an outlet vertical plane of symmetry.

The handle, the control rod, the movable disk, and the cartridge base cooperate to define for the handle a fully closed pivotal position and a plurality of open pivotal positions corresponding to no flow and flow passing through the faucet, respectively. The handle, the control rod, the movable disk, and the cartridge base cooperate to further define for the handle a first angular limit position corresponding to maximum cold water flow and a second angular limit position corresponding to maximum hot water flow, thereby defining an angular range through which the handle may be rotated to deliver cold water, hot water, or a mixture thereof. The handle lies substantially within the inlet vertical plane of symmetry in the fully closed position. The centroid of the outlet opening of one of the inlet ports lies substantially within the inlet vertical plane of symmetry.

In view of the commented figures, one can see how the cartridge base, generally referred to as number (1), is comprised of a circular body with an annular groove (2) where an Or-ring seal (3) is located, so that this annular groove (2) defines a cup-type top section (4) and another bottom one that corresponds with reference (1) itself and that has pivots (5) for the positioning thereof upon the respective body of the faucet, with the particularity that the top part (4) defining a cup remains located inside the body itself of the cartridge (6), from which the corresponding rod (7) emerges through which the respective operating handle or lever is mounted.

Figure 8:
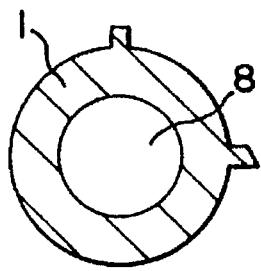

Now then, the base (1) has a pair of inlet holes (8) for cold water and for hot water, holes that in their bottom end, as is clearly represented in FIGS. 2 and 8, have a circular shape, though they can have any other suitable shape, while in their inside or outlet end with regard to the base (1) they have an oblong and arched shape, according to references (8'.)

The symmetric axis (9) comprised between these two holes (8–8') is placed with an angular outphasing with regard to the horizontal axis of the handle, or in other words, with regard to the symmetric axis of the lock between the rod (7) and the handle itself, which is going to determine that in the assembly of the cartridge on the corresponding body of the faucet, the position of the operating handle corresponding to its facing vertically the pipe corresponds with the outflow position of cold water. In FIG. 4, one can see the outphasing, referred to as angle (10), between that which can be considered as the horizontal axis of the handle and the symmetric axis (9) of the two holes (8–8'.)

Figure 6:
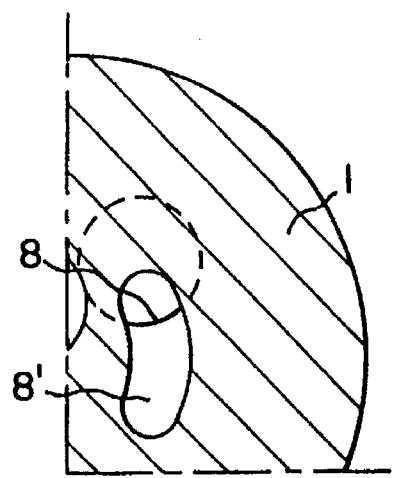
FIGS. 6, 7 and 8 show other section details, according to cutting lines B—B, C—C and D—D, respectively, wherein one sees how the holes provided for in the cartridge base have their inside or outlet end oblong and arched and their outside or inlet end circular, the latter having the possibility of being oval or of any other suitable shape.
Figure 7:
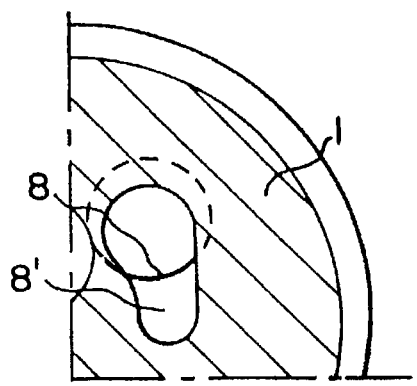

As can be seen and as it has been said above, these holes that are comprised between the inlet (8) and the outlet (8'), are inclined but have a change of path which, in the embodiment shown, has a first straight section (11), a second bent or slightly arched section (12) and a final section (13), with the particularity that as of section (11) corresponding to the inlet (8) of the holes, there is, in section 12, a large slant, as well as a narrowing between the walls thereof, to determine in end section (13) corresponding to the outlet (8') an elongated, narrow and arched, as is clearly represented in FIGS. 4, 6 and 7.

Therefore, the cartridge base (1) has the particularity that the holes or passages comprised between the inlet (8) and the outlet (8') are holes with a change of path that is going to define, at least, three sections (11) (12) and (13), the first one of them in correspondence with inlet (8), the second as a middle one in which the change of path takes place, as well as a narrowing between two opposite walls and a elongation distance between the contrary ones, to define an end section (13) corresponding to outlet (8') that is elongated, arched and narrow, as it has just been said.

The base (1) is complemented with an opening or hole (14) through which the cold water or hot water, or a mixture of both, that accedes through the holes (8) to the cartridge base (1) and flows out through the holes (8'), the flow of the water towards the corresponding outlet pipe is determined.

The shape of the path of the above cited inclined holes, in other words, those determined between the inlet (8) and the outlet (8') of the cartridge base (1) can be defined by two straight sections beginning on each side of the bend, in other words, it may be the middle (12) that is the bend and the sections (11) and (13), indicated in FIG. 5, may be straight.

Likewise, these end sections (11) and (13) may even be arched, or else one of them straight and the other one arched, as long as there is a slant between the inlet (8) and the outlet (8'), the path between inlet (8) and path (8') may even be winding, defining a "S" shape.

Figure 9:
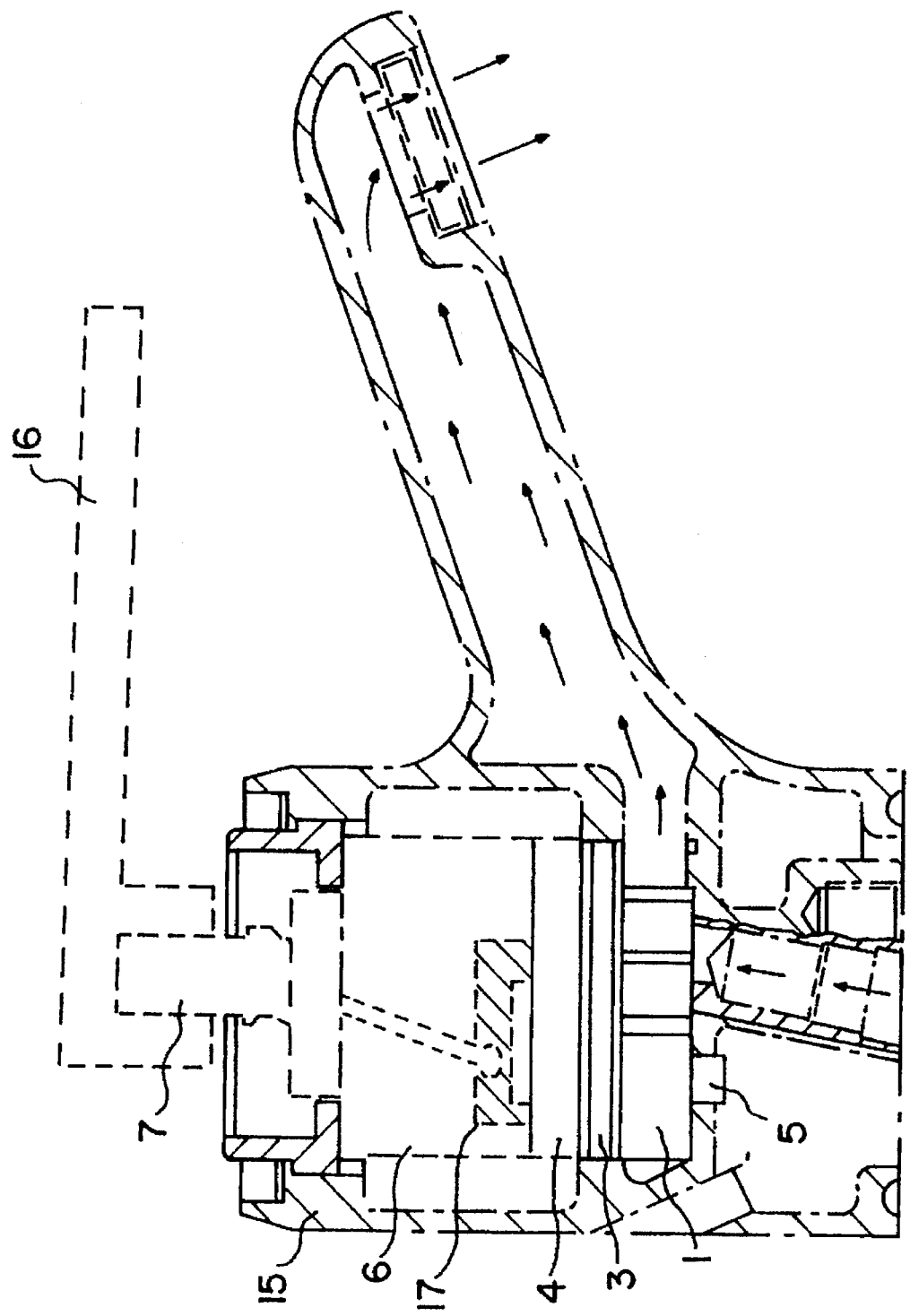
FIG. 9 is a side elevational view of the cartridge base shown mounted in a monoblock faucet, where a side elevational cutaway view of the monoblock faucet, which includes a control rod, a movable disk with a bore, and a handle, is shown in dashed lines.

FIG. 9 illustrates the cartridge base (1) mounted in a monoblock faucet control rod pivotally and rotationally mounted at the top of the faucet body (15), a handle (16) attached to the top end of the control rod (7), a movable disk (17) pivotally attached to the bottom end of the control rod (7), wherein a movement of the handle (16) moves the control rod (7), thereby moving the movable disk (17) in a substantially horizontal plane. The movable disk (17) has at least one bore which allows water to flow from the holes (8–8') to the holes (14).

I claim:

1. A cartridge base for use in a monoblock faucet, said cartridge base being adapted to connect with a hot water inlet source and a cold water inlet source, the monoblock faucet comprising:

a faucet body capable of housing said cartridge base, a control rod pivotally and rotationally mounted at the top of said faucet body, a handle attached to the top end of said control rod, a movable disk pivotally attached to the bottom end of said control rod, wherein a movement of said handle moves said control rod, thereby moving said movable disk in a substantially horizontal plane, and at least one bore disposed in said movable disk; said cartridge base comprising:

a base body having a bottom surface and a top surface;

a pair of inlet ports adapted to connect to the respective hot and cold water inlet sources and disposed through said base body and extending from the bottom surface to the top surface thereof, each of said inlet ports having an inlet opening disposed on the bottom surface, an outlet opening disposed on the top surface, and an inlet wall surface connecting said inlet opening with said outlet opening; wherein the inlet wall surface includes at least one bend and an exit port disposed through said base body and extending from the top surface to the bottom surface thereof, said exit port having an inlet opening disposed on the top surface, an outlet opening disposed on the bottom surface, and an exit wall surface connecting said inlet opening with said outlet opening;

wherein said at least one bore in said movable disk is capable of linking said inlet ports to said exit port;

wherein said inlet openings of said pair of inlet ports define therebetween an inlet vertical plane of symmetry;

wherein the centroid of said outlet opening has an offset from the centroid of said inlet opening in each respective inlet port;

wherein said outlet openings of said pair of inlet ports define therebetween an outlet vertical plane of symmetry;

wherein said handle, said control rod, said movable disk, and said cartridge base cooperate to define for said handle a fully closed pivotal position and a plurality of open pivotal positions corresponding to no flow and flow passing through said faucet, respectively;

wherein said handle, said control rod, said movable disk, and said cartridge base cooperate to further define for said handle a first angular limit position corresponding to maximum cold water flow and a second angular limit position corresponding to maximum hot water flow, thereby defining an angular range through which said handle may be rotated to deliver cold water, hot water, or a mixture thereof; and wherein said handle lies substantially within the inlet vertical plane of symmetry in the fully closed position; and wherein the centroid of the outlet opening of one of said inlet ports lies substantially within the inlet vertical plane of symmetry.

2. The cartridge base according to claim 1 wherein the centroid of the outlet opening of said inlet port connected to the cold water inlet lies substantially within the inlet vertical plane of symmetry.

3. The cartridge base according to claim 2 wherein the centroid of said inlet opening of the other of said inlet ports lies substantially within the outlet vertical plane of symmetry.

4. The cartridge base according to claim 1 wherein the centroid of the outlet opening of said inlet port connected to the hot water inlet lies substantially within the inlet vertical plane of symmetry.

5. The cartridge base according to claim 4 wherein the centroid of said inlet opening of the other of said inlet ports lies substantially within the outlet vertical plane of symmetry.

6. The cartridge base according to claim 1 wherein said offset further comprises an angular displacement about a central vertical axis passing through said cartridge base, and wherein each of said outlet openings of said inlet ports is offset in a same rotational direction from the respective inlet openings.

7. The cartridge base according to claim 1 wherein the outlet vertical plane of symmetry is displaced from said inlet vertical plane of symmetry by an angular displacement being equal to approximately half of the angular range of said handle.

8. The cartridge base according to claim 1 wherein each of said outlet openings of said inlet ports further comprises a substantially kidney shape.

9. The cartridge base according to claim 1 wherein said outlet opening in each of said inlet ports further comprises an inner circular arc concentric with said vertical axis, an outer circular arc concentric with said vertical axis and spaced from said inner circular arc by a radial distance, a first end edge connecting one end of said inner and outer circular arcs, and a second end edge connecting the other end of said inner and outer circular arcs.

10. The cartridge base according to claim 9 wherein each of said inlet openings of said inlet ports further comprises a substantially circular shape.

11. The cartridge base according to claim 10 wherein said radial distance is smaller than the diameter of said substantially circular inlet opening.

12. The cartridge base according to claim 11 wherein said outer circular arc has a length larger than the diameter of said substantially circular inlet opening.

13. The cartridge base according to claim 1 wherein said inlet wall surface of each of said inlet ports has a substantially vertical inlet portion which is substantially perpendicular to the bottom surface of said base body, one end of said inlet portion terminating in said inlet opening.

14. The cartridge base according to claim 6 wherein said inlet wall surface of each of said inlet ports has a substantially vertical outlet portion which is substantially perpendicular to the top surface of said base body, one end of said outlet portion terminating in said outlet opening.

15. The cartridge base according to claim 1 wherein the centroid of the inlet opening of said exit port lies substantially within the outlet vertical plane of symmetry.

16. The cartridge base according to claim 1 wherein the centroid of the inlet opening of said exit port has an exit offset from the centroid of said outlet opening in said exit port.

17. The cartridge base according to claim 1 wherein said wall surface defines at least two bends and the second of said bends causes a change in the direction of said wall surface from the direction defined by the first of said bends.

18. The cartridge base according to claim 17 wherein said wall surface describes a generally S-shaped path.

19. The cartridge base according to claim 1 wherein said outlet opening of each of said inlet ports has an elongated, arched shape.

* * * * *